Figure 1:
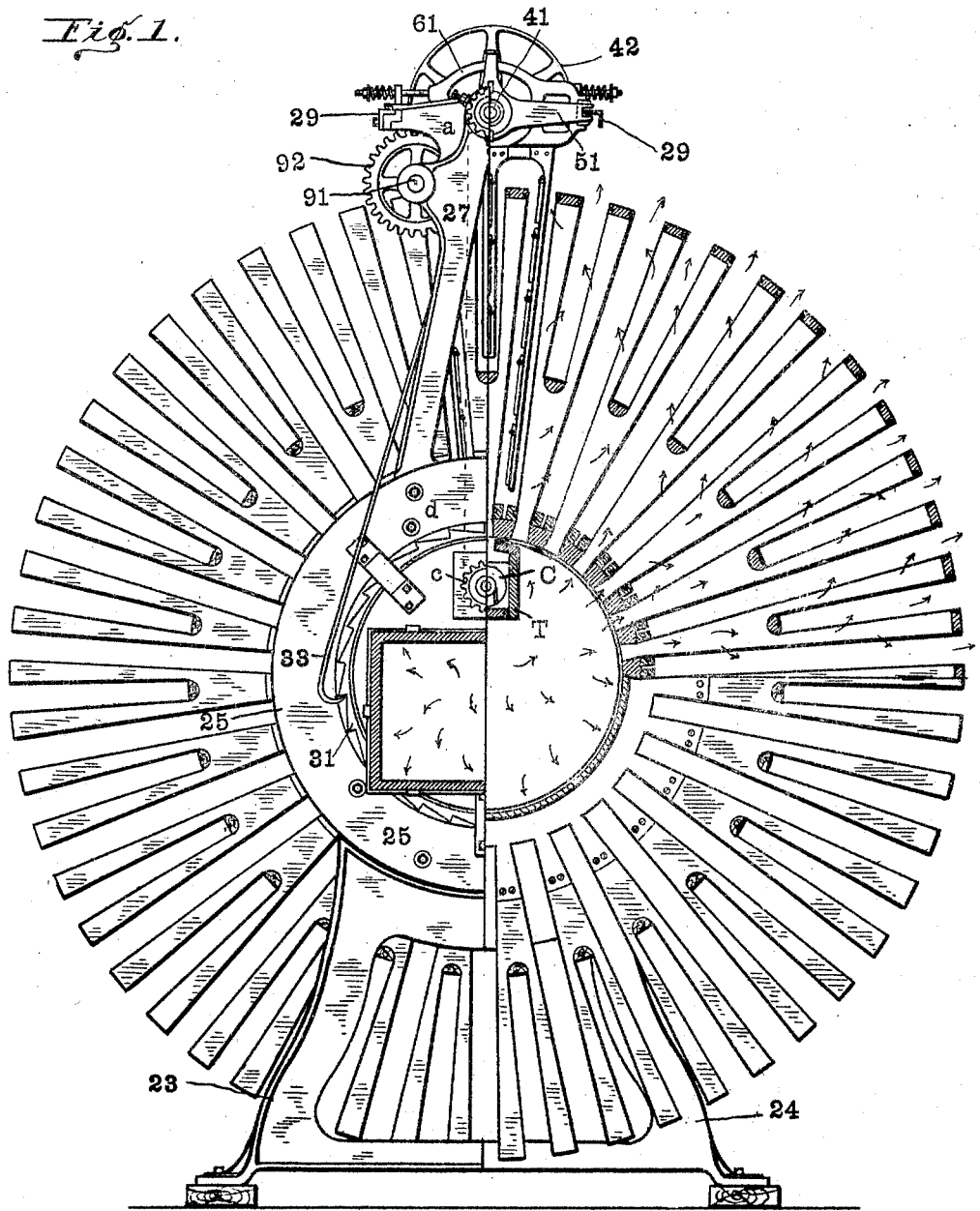

No. 784,140. PATENTED MAR. 7, 1905.
A. C. BRANTINGHAM.
DUST COLLECTOR.
APPLICATION FILED NOV. 9, 1903.

6 SHEETS—SHEET 1.

Witnesses
Adelaide Kearns
J.A. Walsh.

Inventor
Allen C. Brantingham
By
Bradford & Hood,
Attorneys

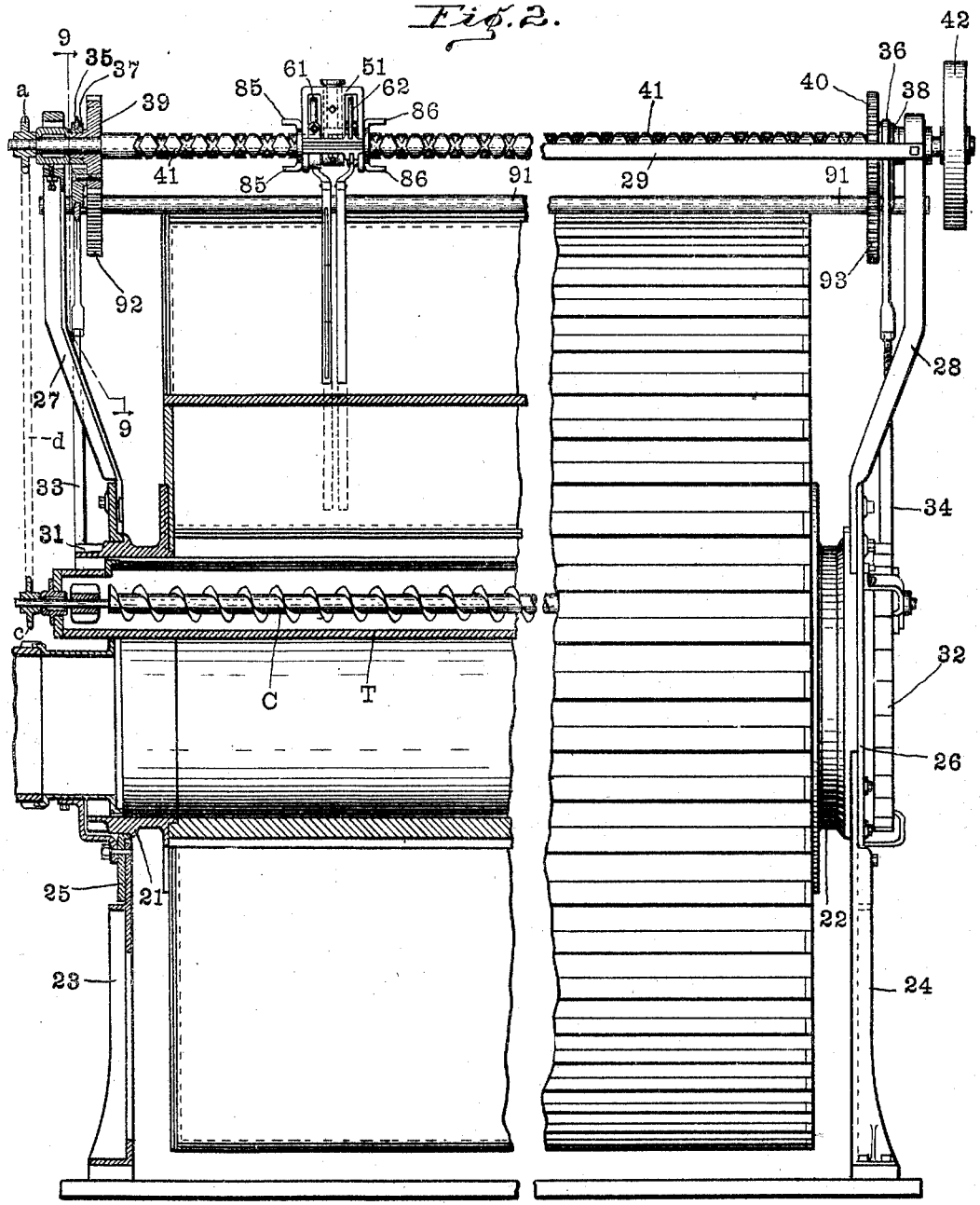

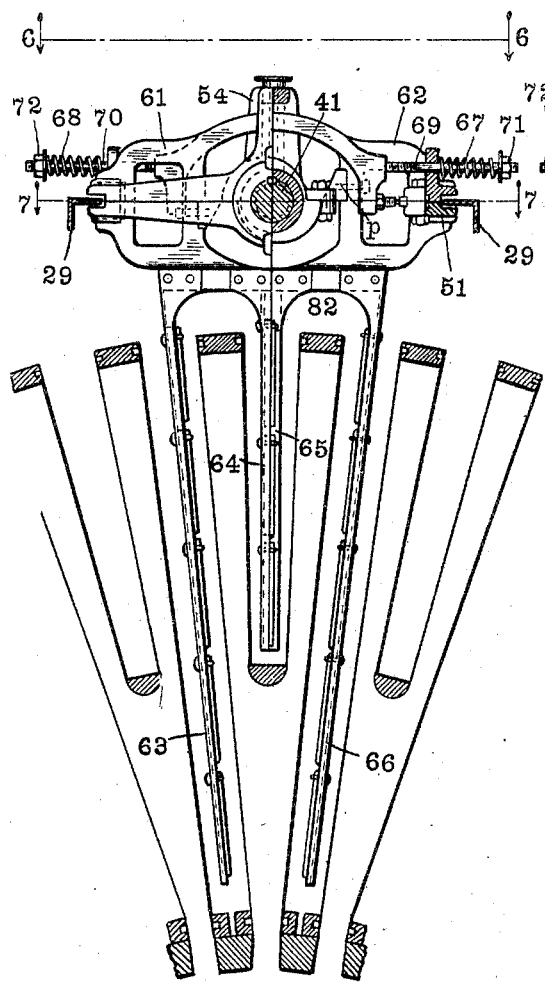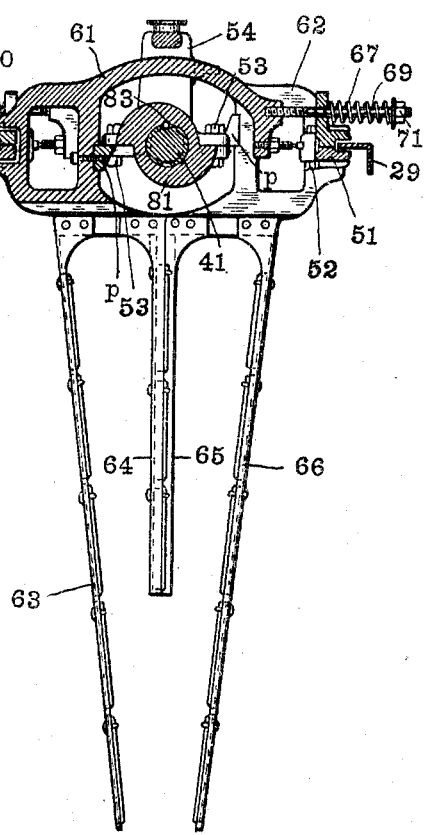

No. 784,140. PATENTED MAR. 7, 1905.
A. C. BRANTINGHAM.
DUST COLLECTOR.
APPLICATION FILED NOV. 9, 1903.
6 SHEETS—SHEET 4.
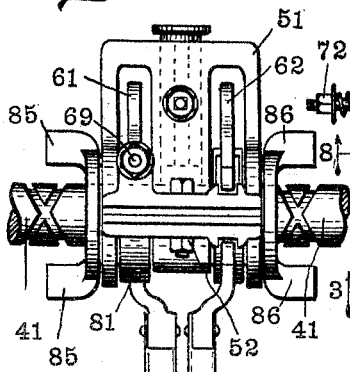
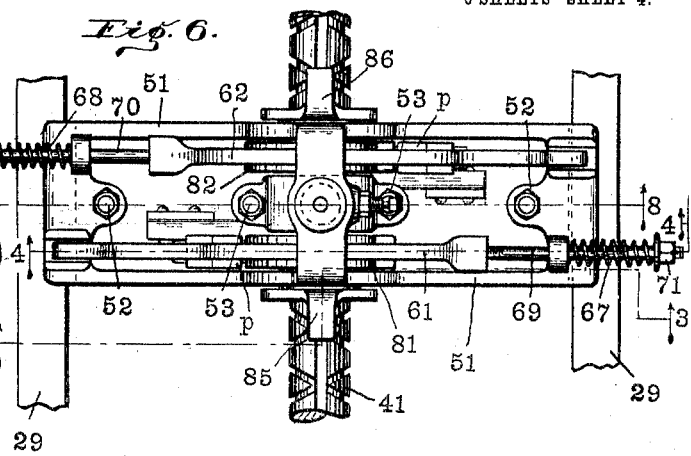
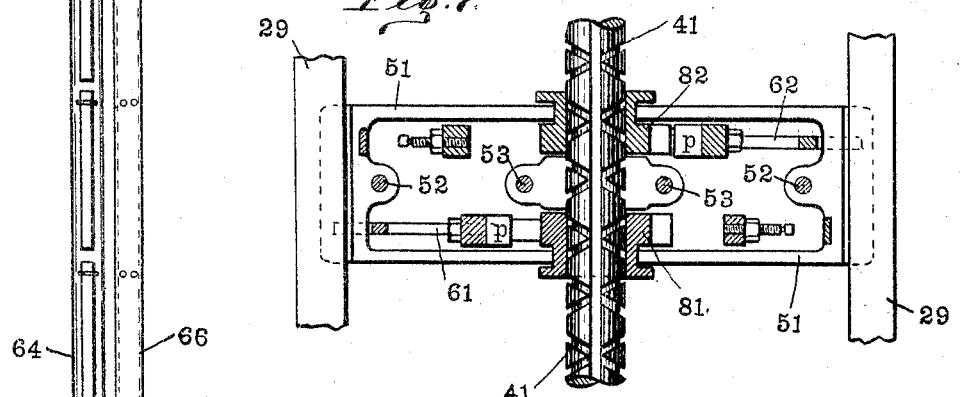
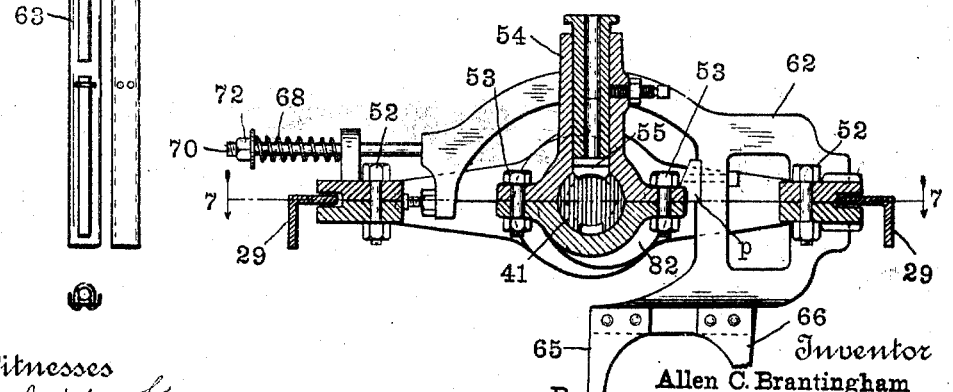
Witnesses
Adelaide Kearns
J. A. Walsh
Inventor
Allen C. Brantingham
By Bradford & Hood
Attorneys

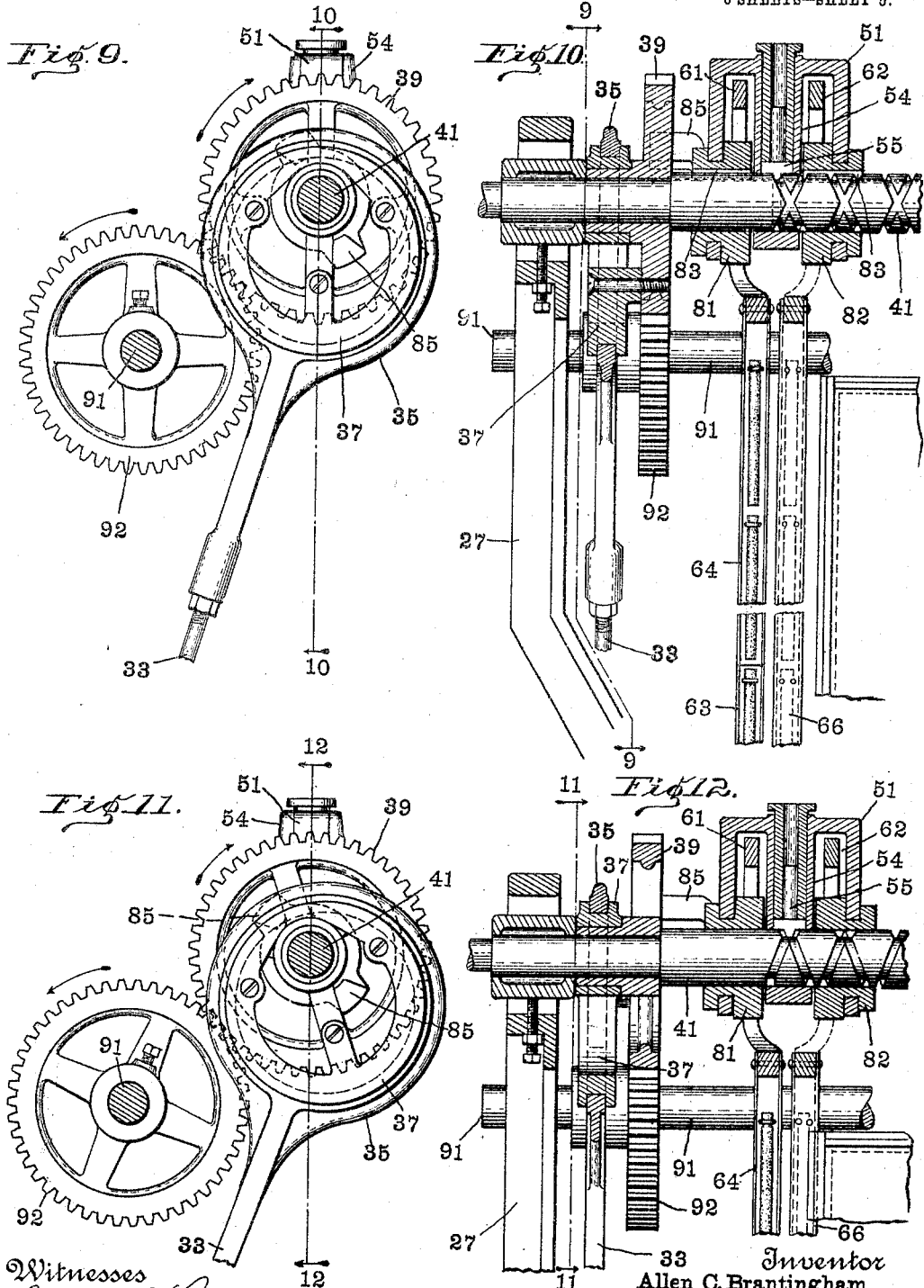

No. 784,140. PATENTED MAR. 7, 1905.
A. C. BRANTINGHAM.
DUST COLLECTOR.
APPLICATION FILED NOV. 9, 1903.
6 SHEETS—SHEET 6.
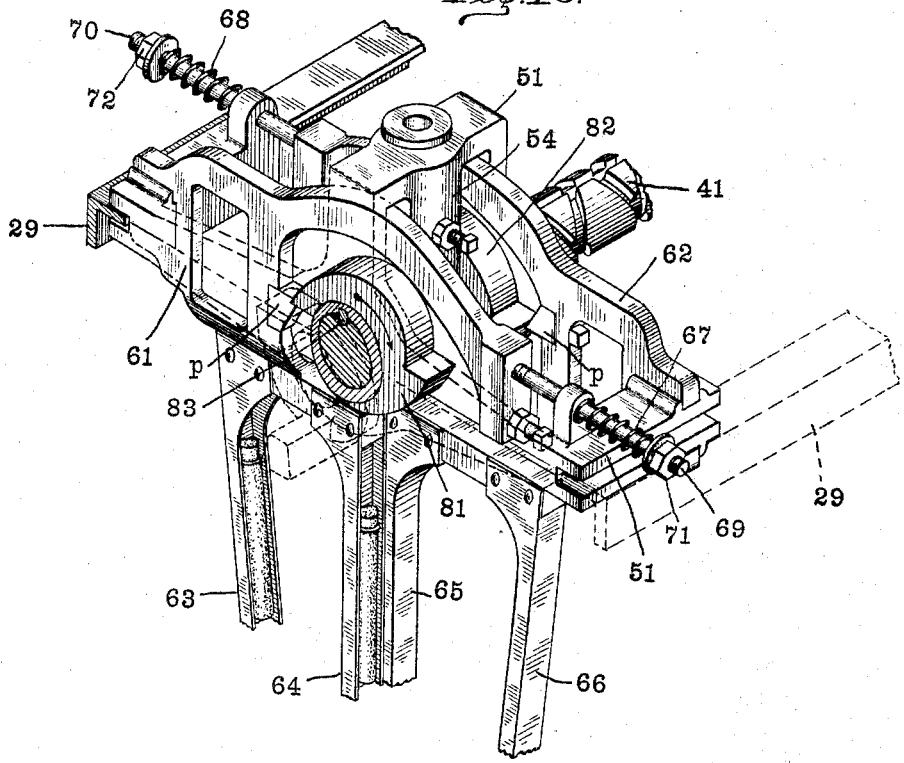
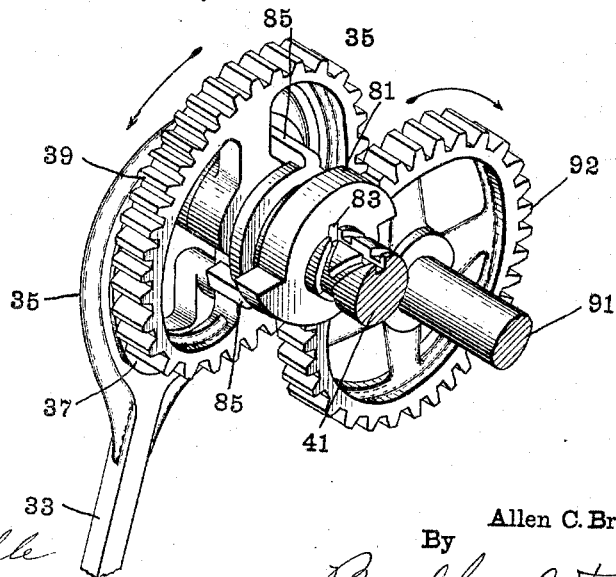
Witnesses
Frank A. Fahle
J. A. Walsh
Inventor
Allen C. Brantingham
By
Bradford V. Hood,
Attorneys.

No. 784,140. Patented March 7, 1905.

UNITED STATES PATENT OFFICE.

ALLEN C. BRANTINGHAM, OF TOLEDO, OHIO.

DUST-COLLECTOR.

SPECIFICATION forming part of Letters Patent No. 784,140, dated March 7, 1905.

Application filed November 9, 1903. Serial No. 180,404.

*To all whom it may concern:*

Be it known that I, ALLEN C. BRANTINGHAM, a citizen of the United States, residing at Toledo, in the county of Lucas and State of Ohio, have invented certain new and useful Improvements in Dust-Collectors, of which the following is a specification.

My present invention relates to dust-collectors of that class which embody a structure composed of a multiplicity of "pockets" or dust-collecting sections and which is rotatable about a horizontal axis.

Said invention consists in means for dislodging the accumulated dust from the surfaces of the dust-collecting sections and in means for causing the "whippers" or dust-dislodging devices to operate upon the sections successively.

It further consists in certain details of construction and arrangement of parts, all as will be hereinafter more particularly described and claimed.

The construction here shown is possessed of some general characteristics which also appear in my pending application Serial No. 151,599.

Referring to the accompanying drawings, which are made a part hereof and on which similar reference characters indicate similar parts, Figure 1 is a view, partially in end elevation and partially in transverse section, (at two different points,) illustrating a dust-collector embodying my said invention; Fig. 2, a view, partially in longitudinal vertical section and partially in side elevation, of said machine; Fig. 3, a view of the dust-dislodging devices and immediately adjacent parts, partially in elevation and partially in section as seen when looking in the direction indicated by the arrows from the dotted line 3 3 in Fig. 6; Fig. 4, a vertical sectional view through said dust-dislodging devices as seen when looking in the direction indicated by the arrows from the dotted line 4 4 in Fig. 6; Fig. 5, a fragmentary side elevation of said devices similar to a portion of Fig. 2, but on a considerably-enlarged scale; Fig. 6, a top or plan view of the parts shown in Figs. 3, 4, and 5 as seen when looking downwardly from the dotted line 6 6 above Fig. 3; Fig. 7, a horizontal sectional view as seen when looking downwardly from the dotted line 7 7 in Figs. 3 and 8, and Fig. 8 a detail sectional view as seen when looking in the direction indicated by the arrows from the dotted line 8 8 in Fig. 6; Fig. 9, a detail view as seen when looking in the direction indicated by the arrows from the dotted line 9 9 in Figs. 2 and 10; Fig. 10, a sectional view of the gearing at that point in its at-rest position as seen when looking in the direction indicated by the arrows from the dotted line 10 10 in Fig. 9; Fig. 11, a view as seen when looking in the direction indicated by the arrows from the dotted line 11 11 in Fig. 12; Fig. 12, a view similar to Fig. 10, but showing the parts in another position, as seen when looking in the direction indicated by the arrows from the dotted line 12 12 in Fig. 11; Fig. 13, an isometrical perspective view illustrating the upper portion of the mechanism for operating dust-dislodging devices, and Fig. 14 an isometrical perspective view illustrating the same portion of the mechanism by means of which the rotating structure is periodically advanced as is shown in Figs. 9 and 11.

The dust-collector structure embodies a large central substantially cylindrical opening terminating in large tubular gudgeons 21 22, which rest in suitable bearings in a supporting-framework, said framework being shown in the form of cast legs 23 and 24, mounted on a suitable base and extending up at the ends of the structure and supporting the mechanism. The parts of the frame within which the gudgeons 21 and 22 immediately rest are large annular plates 25 and 26, forming bearings for said gudgeons, and extending up from these in turn are the brackets 27 and 28, which contain or support the bearings for the mechanism to which my present invention more particularly relates. These brackets 27 and 28 are shown as connected by cross-bars 29, which form the upper members of the frame structure and also tracks or ways for the traveler carrying the dust-dislodging devices.

Upon the outer ends of the gudgeons 21 and 22 are annular notched rims 31 and 32, with which the lower hooked ends of the bars 33 and 34 are adapted to engage. The upper ends of said bars 33 and 34 develop into rings 35 and 36, which are mounted on eccentrics 37 and 38. Said eccentrics are secured to spur-gears 39 and 40, so as to rotate therewith when the same are given motion. These gears 39 and 40 are loosely mounted on the longer double screw 41. Said screw is arranged above the rotary dust-collecting structure. It extends from end to end of the machine and is driven continuously during the time the machine is in operation from some suitable source of power, (not shown,) generally by a belt running to a pulley 42 on one end thereof. The gears 39 and 40, however, remain motionless except when engaged by the traveling carriage of the dust-collecting devices, as will be hereinafter explained, and are held in uniform position by the weight of the heavier side of the eccentrics and the rods mounted thereon, so that they are always in the same position at the time the carriages approach them, and therefore are always engaged and operated uniformly, as will be readily understood. When engaged and rotated, the effect is to advance the rotary dust-collecting structure a predetermined distance, as will be hereinafter more fully explained.

The bars 29 constitute tracks for the carriage of the dust-dislodging devices, by which said carriage is held in upright position and guided as it is driven back and forth by the double screw-shaft 41, as well as upper frame members of the machine. The main frame of this carriage 51, as above indicated, rests upon and is guided by the bars 29, being provided with suitable grooves in its opposite ends for that purpose, as shown. It is shown as composed of two parts connected together by the bolts 52 and 53. Centrally it embodies a vertical socket 54, which contains the swiveled tongue 55, which engages with the thread of the screw 41, whereby the carriage as a whole is driven back and forth along said screw in a well-known manner. Mounted on said frame are also the reciprocating frames 61 and 62, which carry the whippers or dust-dislodging devices 63, 64, 65, and 66. The frames 61 and 62 are normally held toward one side of the carrier-frame 51 by the springs 67 and 68, respectively, which are attached thereto by means of bolts 69 and 70, as clearly shown, especially in Figs. 3, 4, and 6 of the drawings. Adjusting-nuts 71 and 72 are provided, by means of which the tension of these springs may be regulated, and the force with which the dust-dislodging devices give their blows is thus determined as may be desired.

Revolubly mounted in bearings in the sides of the frame 51 are the composite structures 81 and 82, which are caused to rotate with the screw-shaft 41 by means of splines 83, which engage with a corresponding groove or keyway in said shaft, but which are free to travel longitudinally of said shaft with said frame. These structures are in part cams, as best shown in Fig. 4, and these operate against projecting points $p$, provided for the purpose on the frames 61 and 62. The operation, as the shaft 41 revolves, driving these structures with it, is such that the cams force the frames 61 and 62 to one side, carrying the whippers or dust-dislodging devices with them, and when the cams escape therefrom the springs 67 and 68 cause these whippers to move suddenly and violently in the opposite direction, and thus deliver their blows upon the surfaces of the filtering-cloth of the pockets or dust-collecting section at the time under treatment.

As has already been indicated, the main dust-collecting structure remains for the most part in a stationary position. In other words, it has no movement about its axis during the time the dust-dislodging devices are being carried axially from one end to the other thereof, and during that period said dust-dislodging devices operate upon surfaces of one section only. The effect is to clean this one set of surfaces thoroughly. As will be noticed, especially by an examination of Figs. 1 and 2, the dust-collecting section at the time being cleaned is the one which stands vertically and is at the time on the upper side of the structure. The consequence is that the dust falls down into the trough T, which is immediately below it, and is carried off by means of the conveyer C, which runs in said trough. This conveyer, it may here be mentioned, is preferably driven through suitable connections from the screw-shaft 41, as by sprocket-wheels $a$ and $c$ and chain belt $d$. When, however, the carriage carrying the dust-dislodging devices approaches the end of its travel, arms 85 on the structure 81 and arms 86 on the structure 82 cause a further operation, one at one end of the travel and the other at the other, according to circumstances. I will describe this operation in connection with the set of mechanism shown at the left hand of Fig. 2 of the drawings and in detail, Figs. 9, 10, 11, and 12. When the parts in question are at rest, the gear-wheel 39 and the cam and other parts operated thereby are in the positions indicated in Fig. 9 of the drawings. As the carriage 51 approaches the gear-wheel 39 the arms 85 on the structure 81 are in the position indicated in Fig. 11 at the moment they begin to pass in between the arms of said gear-wheel. By the time the arms have entered the distance indicated by the dotted lines in Fig. 10 they have come in contact with the arms of the wheel 39, and in the further movement said wheel 39 is carried around with the structure 81, and this continues for nearly a complete revolution or until the wheel 39 is in the position indicated in Fig. 11, at which point the arms 85 escape therefrom, the member 55 having by this time both shifted in position and traveled back that distance along the other thread of the screw-shaft 41, which carries said arms out of engagement, as already stated. The wheel 39 will not, however, stop at this point, but by reason of the gravity of the eccentric and of the parts suspended thereon it will continue moving until it returns to its original position, being that indicated in Fig. 9. That part of the groove in the double screw-shaft 41 which connects the two threads thereof preferably has a straight middle portion, as indicated by the dotted lines in Fig. 10, and consequently the carriage 51 pauses for a short period while the member 55 is traversing this part of the groove before starting on its return movement. When the carriage 51 reaches the other end of the screw-shaft 41, the operation just described is duplicated. In either case the eccentrics, through rods 33 and 34, engage with the toothed rims 31 and 32 and revolve the whole dust-collecting structure sufficiently so that the next set of dust-collecting surfaces will come in line with the path of the whippers or dust-dislodging devices. This occurs while said whippers are at the ends of the dust-collecting structure, in the vacant space between said ends and the outer framework of the machine. In order that both pull-rods shall be operated by each of the operations, a counter-shaft 91 is provided, bearing upon its ends spur gear-wheels 92 and 93, which are in mesh with the spur gear-wheels 39 and 40, carrying the eccentrics. By this means, as will be readily understood, the pull upon both ends of the dust-collecting structure in each case is uniform, so that racking of the necessarily somewhat light frame of said structure, which would otherwise occur if the strain was all from one end, is avoided.

Having thus fully described my said invention, what I claim as new, and desire to secure by Letters Patent, is—

1. The combination, in a dust-collector, of a dust-collecting structure rotatable about a horizontal axis and containing a central opening into which the dust-laden air is delivered, a dust-receiving trough located within said central opening and provided with an ingress-passage adapted to register with each of the several dust-collecting sections as the structure is revolved, an axially-traveling carriage mounted above said dust-collecting structure and bearing dust-dislodging devices which extend down between the walls of the section at the time uppermost, means for operating said dust-dislodging devices to deliver blows upon said walls as they travel over them, mechanism positioned at each end of the structure with which said traveling carriage will engage as it reaches said ends respectively, which mechanism is thus caused to move the dust-collecting structure forward a predetermined distance while the dust-dislodging devices are at the ends of the structure and beyond the ends of the sections thereof, and means for reversing the travel of the carriage of the dust-dislodging devices when this is accomplished, whereby said dust-dislodging devices are automatically caused to travel back and forth over successive sections, and the sections are automatically presented to their action, substantially as set forth.

2. The combination, in a dust-collector, of a rotary structure containing a multiplicity of separating sections radially disposed therein, dust-dislodging devices adapted to travel back and forth between the walls of said sections and deliver blows thereon, a carriage arranged to travel back and forth over said structure substantially parallel with the axis thereof and carrying said dust-dislodging devices, mechanism for periodically advancing the rotary dust-collecting structure a distance equal to the width of a dust-collecting unit, and engaging devices carried by the carriage for engaging with said mechanism and causing the same to operate as said carriage reaches the end of its movement in each direction.

3. The combination, in a dust-collector, of a rotary structure comprising a multiplicity of dust-collecting sections radially disposed, a continuously-moving double screw-shaft mounted above said dust-collector, a gear-wheel loosely mounted at each end of said shaft, an eccentric rigidly mounted on each gear-wheel, rods extending down from said eccentrics and provided with engaging ends, toothed rims secured to the ends of the dust-collecting structure with which said engaging ends will engage, a carriage carrying the dust-dislodging devices operated by said screw-shaft, and means carried by said carriage for causing said gear-wheels to revolve as the carriage approaches and carries said means into contact with them.

4. The combination, in a dust-collector, of a rotary structure mounted to revolve horizontally, a double screw-shaft arranged above said structure, a stationary track arranged parallel to said shaft, a carriage mounted on said track, a driving connection between said carriage and shaft whereby said screw-shaft may drive the carriage longitudinally of the dust-collector, dust-dislodging devices mounted on said carriage, cams mounted in said carriage and revolved by said shaft for actuating said dust-dislodging devices, and means situated at the ends of the structure for reversing the engagement of the double screw and thus causing the carriage to travel back and forth.

5. The combination, in a dust-collector, of a rotary structure comprising a multiplicity of dust-collecting sections having open longitudinal spaces between them, dust-dislodging devices adapted to pass between said sections through said spaces, a carriage for said dust-dislodging devices, means for driving said carriage from end to end of the structure, mechanism for intermittently advancing the dust-collecting structure a distance equal to the size of a dust-collecting unit, means whereby the carriage is caused to operate said mechanism at the ends of the travel, and a counter-shaft extending from end to end of the dust-collector whereby the rotating means at both ends are caused to operate simultaneously.

6. The combination, in a dust-collector, of the rotary structure comprising the dust-collecting sections, dust-dislodging devices adapted to travel back and forth over said sections, and mechanism adapted to be operated by said dust-dislodging devices as they reach either end of their path of movement, respectively, comprising loosely-mounted gear-wheels arranged at each end of said path, eccentrics rigidly secured to each of said gear-wheels, rods mounted on and operated by said eccentrics and having engaging members at the other ends, toothed rims with which said members will engage, a counter-shaft also extending from end to end of the structure, and gear-wheels rigidly mounted thereon which engage with said first-mentioned gear-wheels, whereby the mechanism at both ends of the structure are operated simultaneously, substantially as and for the purpose set forth.

7. The combination, in a dust-collector, of a rotary structure comprising a multiplicity of dust-collecting sections, dust-dislodging devices adapted to travel back and forth between said sections and deliver blows onto the surfaces thereof, a carriage carrying said dust-dislodging devices supported on a suitable track and operated by a double screw, the said track, the said screw, cams mounted in said carriage and revolubly connected to said shaft, reciprocating frames mounted in said carriage and upon which the dust-dislodging devices are immediately secured, and springs connected to said reciprocating frames and to the carriage-frame, said reciprocating frames being actuated in one direction by said cams and in the other direction by said springs.

8. In a dust-collector, the combination of, a rotatable structure comprising a multiplicity of dust-collecting sections, a dust-dislodging device, means for driving said dust-dislodging device through the dust-collecting sections of the rotatable structure substantially parallel with the axis of the rotary structure, and means for intermittently angularly advancing the rotary structure with relation to the dust-dislodging device, whereby said dust-dislodging device may be driven through the dust-collecting sections successively from end to end substantially parallel with the axis of the rotatable structure.

In witness whereof I have hereunto set my hand and seal, at Toledo, Ohio, this 4th day of November, A. D. 1903.

ALLEN C. BRANTINGHAM. [L. S.]

Witnesses:
G. N. SMITH,
WADE HOLLAND.